Patented Aug. 8, 1933

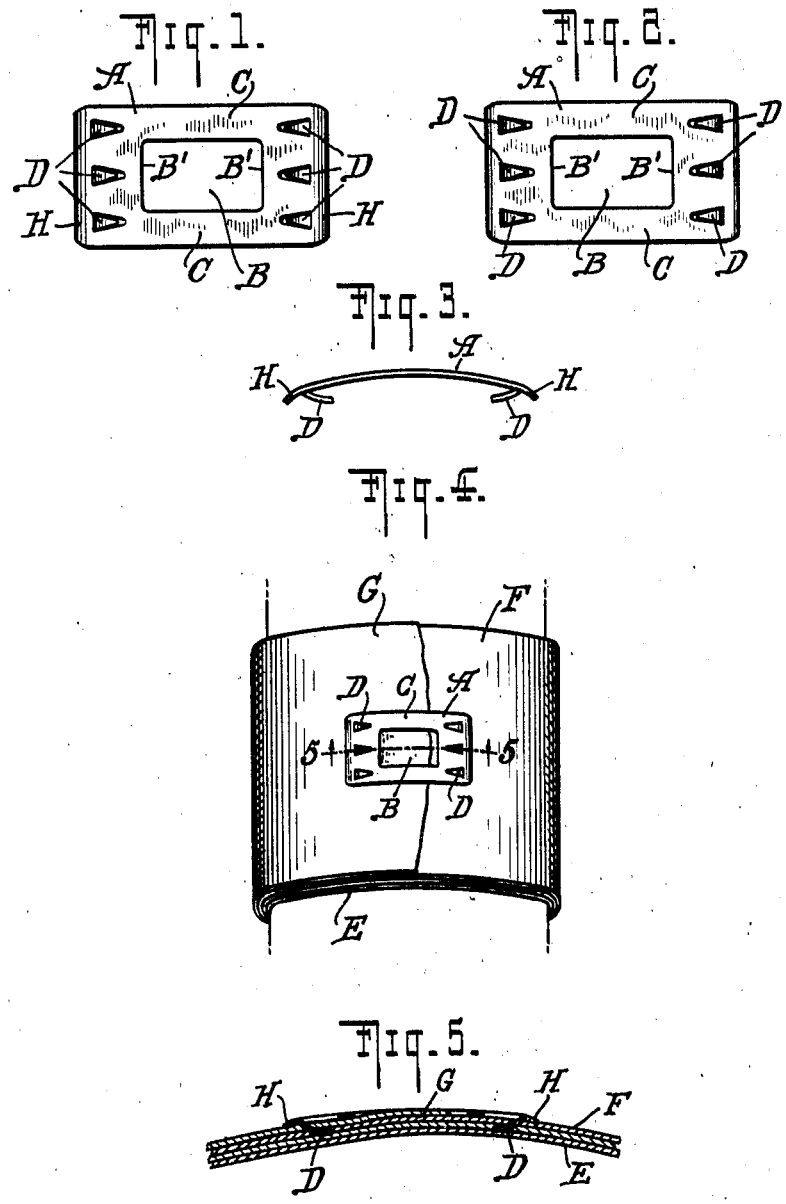

1,921,999

UNITED STATES PATENT OFFICE 1,921,999

BANDAGE FASTENER

Fairleigh S. Dickinson, Rutherford, N. J.

Application November 11, 1932
Serial No. 642,171

3 Claims. (Cl. 24—87)

The invention relates to bandage fasteners, especially fasteners adapted for use in connection with surgical bandages to hold them in place.

The object of the invention is to provide a simple, durable, clean, sterilizable, safe, reliable, and inexpensive means for securely and conveniently fastening the end of a bandage or the like after the same has been applied to any part of an animate body or elsewhere, the bandage in the applied position of the fastener being free from projecting parts or sections likely to engage or to catch in fabrics such as clothes or dresses, towels, handkerchiefs, or similar fabrics extraneous of the bandage. A further object of the invention is to fashion the bandage fastener in such a manner that it will be incapable of inflicting injury upon any one handling the same or upon the patient who carries the bandage, and, although unseatable in use, shall be readily detachable whenever desired.

Thus far the customary manner of fastening bandages involved knotting, basting, the use of safety pins, adhesive tape, or other adhesive material or multipart structures comprising an elastic element. All of these known means of fastening bandages possess numerous drawbacks and the fastening clip of the present application was designed to overcome all such defects. Essentially the new clip comprises a relatively thin bendable plate sufficiently flexible and free from longitudinal springiness to adapt itself automatically to whatever may be the curvature of the bandage and to retain its bent position until further flexed by a positively applied physical force, having teeth punched from the body of the plate projecting from opposed edge portions of the plate in a direction toward the center of the plate, the pointed portion of the teeth or prongs lying in approximately the same plane. With this organization of elements a one-piece clip is made available, the teeth of one row being readily anchorable in the stretched free end of the bandage while the opposed teeth, when the clip is pressed down, will automatically find anchorage in that surface of the bandage which lies adjacent to the free end of the bandage. The clip is then securely maintained in position by the stretch of the fabric of the bandage, all such stretch serving to more firmly anchor the teeth and to cause the clip to conform itself to the curvature of the bandage and to draw the body of the clip down against the surface of the bandage, thereby eliminating projecting parts. When the clip is to be removed, all that is required is to draw the clip or the free end of the fabric in a direction tending to tighten the bandage and this action will loosen from the bandage the prongs of the clip which were anchored in the bandage forward of the free end thereof. As soon as those prongs are disengaged from the bandage, the clip can be lifted away.

The invention is illustrated in the accompanying drawing in which Fig. 1 represents a plan view of the clip; Fig. 2 represents a bottom view; Fig. 3 is a side elevation; Fig. 4 shows the clip in position in association with the bandage, and Fig. 5 is a section on line 5—5 of Fig. 4.

In the drawing the clip itself is marked A. It may be formed of a piece of stamped metal having sufficient inherent rigidity to prevent the prongs D from being bent out of operative position with relation to the plate A and also sufficient flexibility, longitudinally, to be available for the purposes described. Any suitable metal may be used, such as steel, brass, etc., provided it has the necessary inherent flexibility. The metal may also be enamelled, nickel plated, chrome-plated, or made of rust-proof steel. In any event it is preferable that the surface shall be such as to be resistant against the effects of sterilizing treatment.

The plate A is preferably centrally apertured at B, thereby not only making the clip extremely light in weight but also increasing the flexibility of the clip at those parts thereof marked C. The fenestration of the plate may consist of a single aperture as shown, or of a plurality or multiplicity of smaller apertures. In the latter case the fingers which grip the clip may not meet through the plate but the required finger-frictioning contact will in that case be found in the edges of the openings. Prongs or teeth D are stamped out of the body of the plate A and the pointed ends of the prongs lie in approximately the same plane as indicated in Figs. 3 and 5, the effect of which is that if a finger is drawn lightly across the under side of the clip toward the pointed ends of the prongs, it will not be caught by the prongs but will slide over them notwithstanding that the prongs have relatively sharp pointed ends. The clip is preferably provided with an initial curvature as indicated in Fig. 3. When such a clip is applied to a bandage surrounding a finger, for example, the curvature of the clip can readily be increased by pressure applied to the clip against the bandage until the clip has assumed the curvature of the bandage. In Figs. 4 and 5 the bandage illustrated is of the character of a bandage applied to an arm. The bandage itself has the usual inner convolutions E, the outer convolution F and the free end of the bandage G. After the bandage has been applied, the teeth D at one side of the clip are drawn along the free end of the bandage G and anchor themselves therein. The free end of the bandage G is then given a slight additional tension by drawing the clip toward the right-hand side of Fig. 4 whereupon the unattached end of the clip is pressed down upon the convolution F and the tension released. Thereupon the previously unattached prongs will attach and anchor themselves automatically in the convolution F and frequently in one or more of the lower convolutions E since the space between the planes occupied respectively by the plate A and the points of the prongs D is slightly greater than that of a single thickness of bandage material. When thus applied the clip as a whole tends to sink bodily into the fabric to a slight extent as indicated in Fig. 5, thereby presenting a smooth surface in conjunction with the surface of the bandage and presenting no obstructions or projecting parts on which anything could be caught. The shape of the prongs is preferably that of an isosceles triangle having an angle at its apex approximating 30°. A materially larger apex angle would not supply adequate anchorage in the fabric of the bandage. At the same time this angular relation is one which serves when the tension between the two ends of the clip is released to permit the elasticity of the meshes of the fabric of the bandage operating against the sides of the triangle constituting the prongs D to force those prongs out of the fabric, thereby relieving the user of the necessity of painstakingly unhooking the clip as he would have to do if the prongs had parallel sides. The central aperture B of the clip also enables the clip to be more readily handled in its application to and removal from the bandage by reason of the fact that the fingers which manipulate the clip, meeting through the aperture B, will come into contact with one of the edges B' and drawing against said edge, obtain a firm hold on the clip, while the under finger is not exposed to the possibility of being brought into pressure contact with relation to the pointed ends of the prongs adjacent to that edge B' toward which the clip is being pulled. In the drawing I have shown a clip having three prongs near each of the lateral edges thereof but the number of teeth on each side may be of any desired number, the usual range being from two to eight according to the size of the bandage or the material used. The lateral edges of the clip at H are preferably bent down so as to seat themselves in the bandage end G and the outer convolution F in the manner illustrated in Fig. 5 so as to present a smooth surface at this point and not an edge with respect to fingers or fabrics passing thereover. The clips are practically indestructible and can be used over and over again with intermediate sterilization whenever desired. They are handy, more efficient than any other existing bandage fasteners and are very inexpensive. At the same time they can be depended upon to perform their functions reliably. They can be placed in position and removed with the utmost ease and the greatest speed without extraneous assistance or the necessity of cutting any threads or knots. They reliably prevent any loosening or sliding of the bandage, once positioned, since any alteration in the bandage itself, due to muscular activity or the like, merely itensifies the tenacious grip of the clip. Nor does the clip cause any pressure, noticeable by the patient, but it lies upon and against the bandage material smoothly and without projecting portions. In its preferred form it is rustproof and sterilizable at will containing no rubber or elastic material which would deteriorate under such treatment. It has accordingly, in the relatively short space of time that it has been available for use by physicians and patients, met with great and steadily increasing favor.

I claim:

1. A surgical bandage fastening device comprising a thin, longitudinally flexible, transversely rigid metal plate, said flexibility being of such order as to permit the plate to be readily deformed to conform to the curvature of a bandage when in place and inertly to retain the deformed condition, two sets of prongs struck from the body of the plate at a distance from the transverse edges thereof, said edges being smooth, one set of such prongs projecting from one end section of the plate in a direction toward the transverse central line of said plate, the other set of prongs projecting from the same side of the plate but from the other end section and pointing toward the points of the prongs of the first end section, the points of the several prongs lying in approximately the same plane said plate being so free from inherent springiness in the longitudinal direction as to be adapted to be held in position on the bandage solely by reason of the tension of the bandage against the prongs, the material of the plate being otherwise of such rigidity as to prevent the prongs from being bent out of operative position with relation to the plate proper.

2. A surgical bandage fastening device comprising a thin, longitudinally flexible, transversely rigid metal plate, said plate being weakened in the region of its middle portion by perforation of the metal at said point, said flexibility, enhanced by said perforation of the plate, being of such order as to permit the plate to be readily deformed to conform to the curvature of a bandage when in place and inertly to retain the deformed condition, two sets of prongs struck from the body of the plate at a distance from the transverse edges thereof, said edges being smooth, one set of such prongs projecting from one end section of the plate in a direction toward the transverse central line of said plate, the other set of prongs projecting from the same side of the plate but from the other end section and pointing toward the points of the prongs of the first end section, the points of the several prongs lying in approximately the same plane, the longitudinal side portions of the plate adjacent to the perforation, being so free from inherent springiness in the longitudinal direction that the plate is adapted to be held in position on the bandage solely by reason of the tension of the bandage against the prongs, the material of the plate being otherwise of such rigidity as to prevent the prongs from being bent out of operative position with relation to the plate proper, said perforated condition of the said plate serving additionally, to provide a finger gripping section and to reduce the weight of the plate 3. A surgical bandage fastening device comprising a thin, longitudinally flexible, transversely rigid metal plate, said flexibility being of such order as to permit the plate to be readily deformed to conform to the curvature of a bandage when in place and inertly to retain the deformed condition, two sets of prongs struck from the body of the plate at a distance from the transverse edges thereof, said edges being bent down slightly toward the side of the plate which is to contact with the bandage, one set of such prongs projecting from one end section of the plate in a direction toward the transverse central line of said plate, the other set of prongs projecting from the same side of the plate but from the other end section and pointing toward the points of the prongs of the first end section, the points of the several prongs lying in approximately the same plane, said plate being so free from inherent springiness in the longitudinal direction as to be adapted to be held in position on the bandage solely by reason of the tension of the bandage against the prongs, the material of the plate being otherwise of such rigidity as to prevent the prongs from being bent out of operative position with relation to the plate proper.

FAIRLEIGH S. DICKINSON.